No. 717,421. Patented Dec. 30, 1902.
H. J. LEIGHTON.
STEERING DEVICE FOR VEHICLES.
(Application filed Oct. 29, 1902.)
(No Model.)
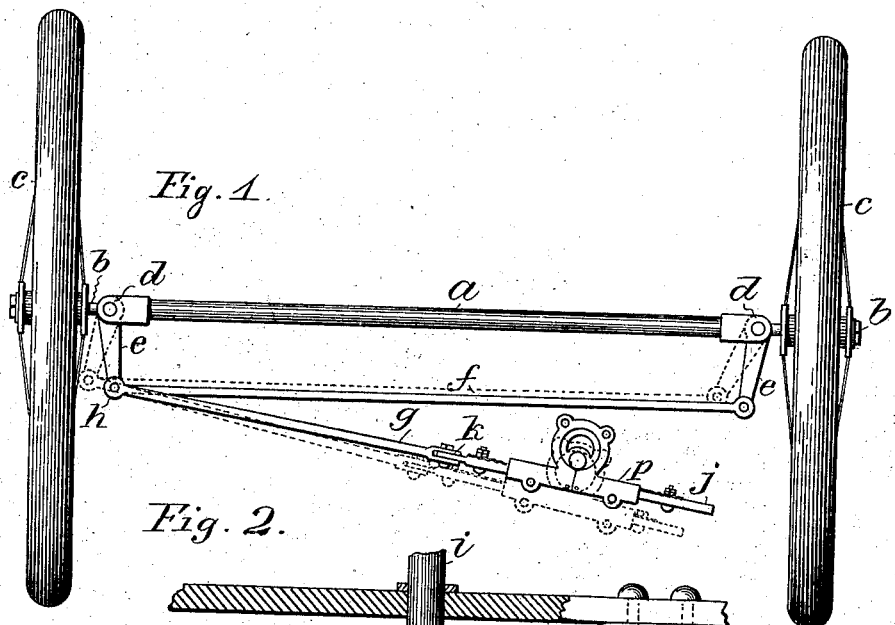
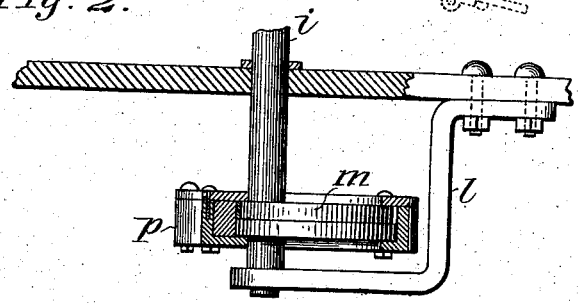
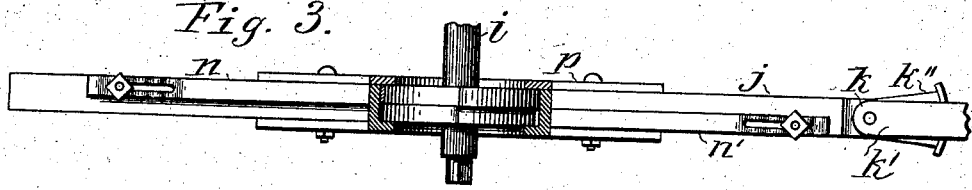
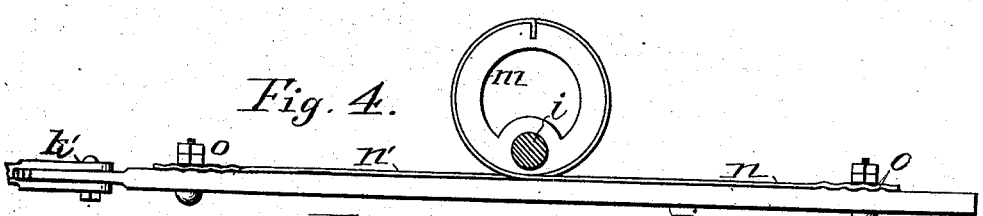
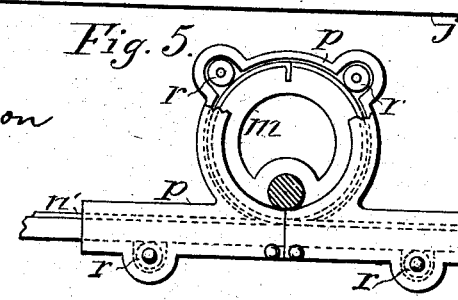
Witnesses:
M. J. Dixon
W. R. Berry
Inventor:
Herbert J. Leighton,
by Henry H. Bates,
atty.
THE NORRIS PETERS CO., PHOTO-LITHO., WASHINGTON, D. C.

UNITED STATES PATENT OFFICE.

HERBERT J. LEIGHTON, OF SYRACUSE, NEW YORK.

STEERING DEVICE FOR VEHICLES.

SPECIFICATION forming part of Letters Patent No. 717,421, dated December 30, 1902.

Application filed October 29, 1902. Serial No. 129,233. (No model.)

*To all whom it may concern:*

Be it known that I, HERBERT J. LEIGHTON, a citizen of the United States, residing at Syracuse, in the county of Onondaga and State of New York, have invented certain new and useful Improvements in Steering Devices for Vehicles; and I do hereby declare the following to be a full, clear, and exact description of the invention, such as will enable others skilled in the art to which it appertains to make and use the same.

My invention relates to improved means for steering vehicles, especially those of the self-propelling class. In this class of vehicles the wheel-bearing axles are jointed to the main axle of the vehicle so as to move independently of the same in vertical or inclined planes, said main axle (usually the front one) remaining relatively fixed. The angular change of position of the wheels is commonly effected by means of lever-arms secured to the vertical bearings of the movable axles at the proper convergent angles connected together by a link or other suitable means, so as to move in accord. Various means for moving these lever-arms under the control of the driver are supplied, and it is in the construction and adaptation of these latter means that my improvement especially consists, the object being to furnish a reliable and safe steering device which shall respond readily to the driver's hand, and yet be firmly locked against accidental displacement when the wheels are running in a straight path and encounter some unforeseen obstacle liable to divert them from the true course if not firmly held.

In the drawings forming a part of this specification, Figure 1 is a plan view of the front portion of a vehicle to which my improvement is applied. Fig. 2 is a side view, partly in section, enlarged, showing the improved steering apparatus attached to the under side of the floor of the vehicle. Fig. 3 is a detached view of the steering-pinion and steering-plate from the pinion side. Fig. 4 is a plan view of the steering pinion and plate. Fig. 5 is a plan view showing the casing for the pinion and steering-plate, a part of the top plate being broken away.

The general arrangement of the fixed main axle, the movable wheel-bearing axles, the convergent lever-arms which move the latter in unison, and the link connecting them are of the usual construction and need no further description, $a$ being the fixed main axle; $b\ b$, the movable axles inclosed within wheel-hubs; $c\ c$, the wheels mounted thereon; $d\ d$, the vertically-placed joints on which said axles are hinged; $e\ e$, the lever-arms secured to the said movable axles; $f$, the link connection between said arms, and $g$ a steering-rod secured by jointed connection $h$ to one of said lever-arms or to some part in operative connection with them. Said joint $h$ should be flexible in two planes, since the steering-rod shifts its position relatively to the part to which it is connected both horizontally and vertically. An eye-and-bolt connection is shown at $h$, the eye being loose enough in practice to accommodate both movements, as the vertical angular movement is comparatively small.

To operate the steering-rod, there is a main steering-shaft $i$, under control of the driver by means of the usual hand-wheel or a steering lever or tiller, as preferred. Said steering-shaft is operatively connected to the steering-rod $g$ by the novel means about to be described. At the extremity of said steering-rod is secured the steering-plate $j$, preferably by a vertically-flexible joint $k$. Said joint is formed with a long fork-piece $k'$, embracing a broadened projection $k''$, the purpose of which is to procure lateral stiffness in the joint. The steering-shaft is stepped into a strong support, represented by the bracket $l$, and between said bracket and the floor of the vehicle is the steering-pinion $m$, to which the steering-shaft is firmly secured eccentrically at or near the pitch-line of said pinion, which in the absence of gear-teeth lies in its circumference.

$n\ n'$ are two strong and flexible straps of steel or other suitable material securely attached by one end of each to the pinion at a point opposite to the steering-shaft, said straps wrapping around the pinion for a semicircumference, more or less, as the pinion turns, and being adjustably secured at their outer ends, respectively, to the plate $j$, as shown at $o\ o$, which securing device may be bolts and nuts or any other suitable and efficient means for firmly retaining said straps under the irregular strains to which they are subjected. Said straps are slotted to admit of the adjustment, and corrugations are shown in the straps, with corresponding serrations in the plate to make the attachment more secure.

The plate and straps operate similarly to a rack-and-pinion movement, but differ from the latter in that the plate is by this means at all times firmly connected to the pinion and the strap adjustments do away with the backlash to which tooth-gear is liable and which in a steering-gear is a defect.

Surrounding the pinion and steering-plate is a metallic cage $p$, open in the center by a circular aperture, whose radius is the radius of eccentricity, to permit the pinion to revolve. This cage embraces the steering-plate $j$, as well as the steering-pinion, and incloses the latter by a small margin at the edges. To reduce friction, I employ rollers $r\ r$, as many as may be necessary, pivoted in the walls of the cage and located in suitable recesses for the purpose. The cage and steering-rod have a range of oscillation equal at the maximum to the radius of eccentricity of the pinion, as shown in dotted lines in Fig. 1.

It is not necessary in practice that the steering-shaft should be stepped into the steering-pinion absolutely on the pitch-line to secure the locking function aimed at, for the resistance to displacement being great in proportion to the shortness of the leverage it is found sufficient if a short but sensible leverage is employed, while the sensitiveness of the apparatus to the tiller is increased thereby. The steering-pinion should be located at the average level of the point of attachment of the steering-rod to the crank-levers $e$. This level varies somewhat by the oscillations of the vehicle when in motion, for which reason the joints $h$ and $k$ are provided, as shown. In those vehicles in which the steering mechanism is borne by the fixed axle instead of on the vehicle-body the joint $k$ may be dispensed with.

The operation is as follows: The position of the vehicle-wheels when running in a straight course is as shown in Fig. 1. The steering-pinion will then be in its position of minimum leverage with respect to the steering plate and rod and will thereby be virtually locked against accidental displacement should the wheels strike an obstacle, even if the hand of the driver should be carelessly released. When the driver wishes to make a turn, he shifts the steering wheel or tiller in the usual manner, by which action the pinion is turned with a constantly-increasing radius of action and a proportionately-rapid increase of movement upon the steering-rod and lever-arms, giving full command over the position of the steering-wheels in an emergency, combined with great security, by reason of the locked position of the wheels while in the normal or straight course.

I do not confine myself to the particular form of connection between the steering-shaft and the steering-rod shown, since the pinion need not be circular, and any known form of eccentric connecting-gearing which shall effectuate the locked position of the movable axles in the straightaway course of the wheels, combined with a rapid increase of movement and longer radius of action as the tiller moves from the locked position, comes within the scope of my invention. One advantage of such a steering-gear is that while the shift may be made as quickly as by the usual means the operation upon the lever-arms is progressive and gradual, starting with minimum velocity, which in a panicky situation may often save an accident, and in the hands of tyros neutralizes in a measure the fault of oversteering.

I claim and desire to secure by Letters Patent—

1. In steering apparatus for vehicles, in combination with a main axle having wheel-bearing axles pivoted thereto, lever-arms secured to said pivoted axles, a link connection between said lever-arms, a steering-rod operatively connected with said lever-arms, and a steering-shaft; a steering-pinion eccentrically secured upon said shaft, and means between said pinion and said steering-rod connecting them in movable engagement whereby the turning of the pinion moves the rod and wheels, said engagement being at the minimum radius of the pinion when the wheels are in position for running in straight course, by which means the wheels are locked against accidental shifting, substantially as specified.

2. In steering apparatus for vehicles, in combination with pivoted wheel-bearing axles having lever-arms secured thereto connected together to shift in unison, a steering-rod connected with said lever-arms to shift the angular position of the axles, an upright steering-shaft, a steering-pinion eccentrically secured upon said shaft near the pitch-line of said pinion, and means of movable engagement between said pinion and said steering-rod, whereby the latter is held practically locked against displacement near the minimum radius of the eccentric pinion when the wheels are in the position for a straight course, substantially as specified.

3. In steering apparatus for vehicles, in combination with pivoted wheel-bearing axles, having lever-arms secured thereto, connected together to shift in unison, a steering-rod connected with said lever-arms to shift the angular position thereof, an upright steering-shaft, a steering-pinion eccentrically secured upon said shaft near the pitch-line of said pinion, a steering-plate secured to the steering-rod, in movable engagement with the eccentric pinion, said engagement being at the minimum radius of eccentricity when the wheels are in the straightaway course, whereby they are practically locked against accidental displacement, substantially as specified.

In testimony whereof I affix my signature in presence of two witnesses.

HERBERT J. LEIGHTON.

Witnesses:
GRACE D. VAN VORST,
FRED W. HAMMOND.